United States Patent [19]

Dunbar

[11] 4,211,297
[45] Jul. 8, 1980

[54] WEIGHT VEHICLE APPARATUS

[76] Inventor: Glenn G. Dunbar, 2608 Overbrook Dr., Toledo, Ohio 43614

[21] Appl. No.: 931,995

[22] Filed: Aug. 8, 1978

[51] Int. Cl.² .......................................... B62D 21/02
[52] U.S. Cl. ........................... 180/24.02; 280/81 R; 280/111; 280/677
[58] Field of Search ............. 280/677, 678, 679, 680, 280/681, 111, 112 R, 104, 11, DIG. 4, DIG. 11, 81 R; 180/24.05, 24.13, 89.1, 89.13, 24.02; 296/183, 184, 203

[56] References Cited

U.S. PATENT DOCUMENTS

| | | | |
|---|---|---|---|
| 2,316,374 | 4/1943 | Townsend | 280/677 |
| 2,719,044 | 9/1955 | Walter | 296/203 |
| 3,014,734 | 12/1961 | Swenson | 280/111 |
| 3,154,164 | 10/1964 | Shaw et al. | 280/111 |
| 4,096,920 | 6/1978 | Heyn | 280/DIG. 4 |

*Primary Examiner*—John P. Silverstrim
*Assistant Examiner*—Donn McGiehan
*Attorney, Agent, or Firm*—Richard D. Emch; Oliver E. Todd, Jr.; Charles Schaub

[57] ABSTRACT

A weight vehicle apparatus useful for calibrating vehicle scales incorporates a unique pivoted suspension system which uniformly distributes the weight contained in the vehicle apparatus over the surface upon which it rests. The suspension system comprises three axle assemblies: a rearward axle having steerable wheels which is pivoted about the longitudinal axis of the vehicle, a forward axle position having individually driven wheels which are secured to a bogie-like subframe which is transversely pivoted relative to the vehicle and a third axle positioned between the front and rear axles and pivotally secured to the bogie-like subframe for motion about the longitudinal axis of the subframe as well as about the transverse axis of the vehicle apparatus.

7 Claims, 9 Drawing Figures

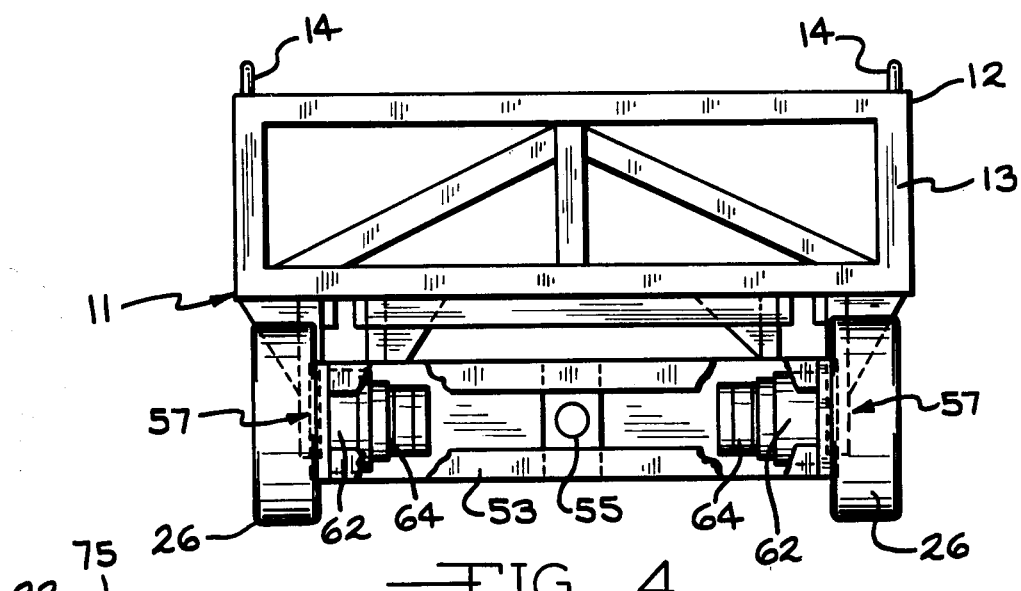
FIG. 4
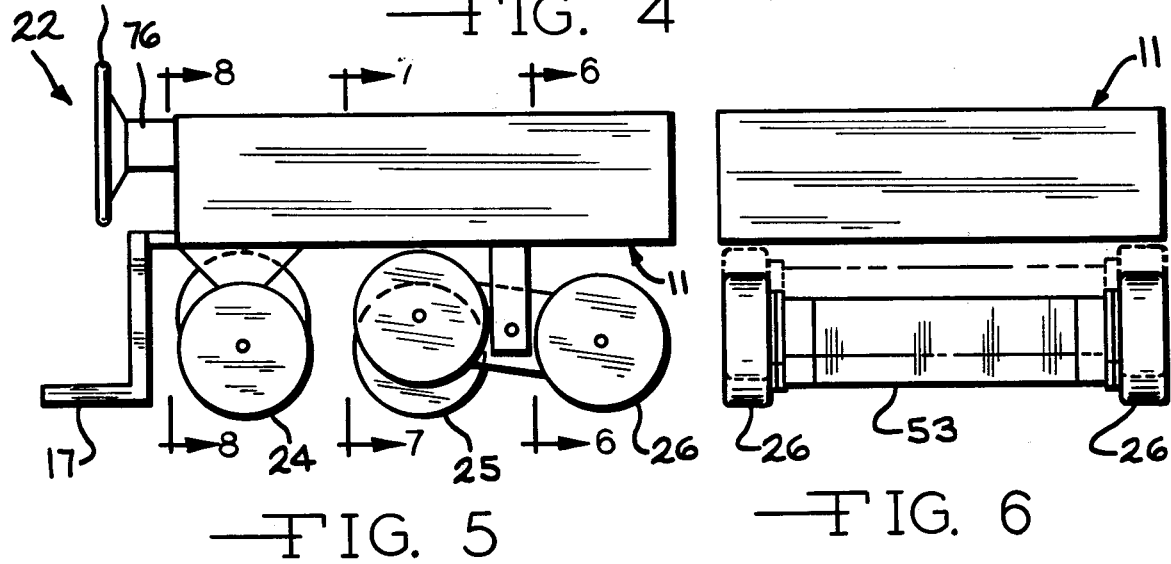
FIG. 5
FIG. 6
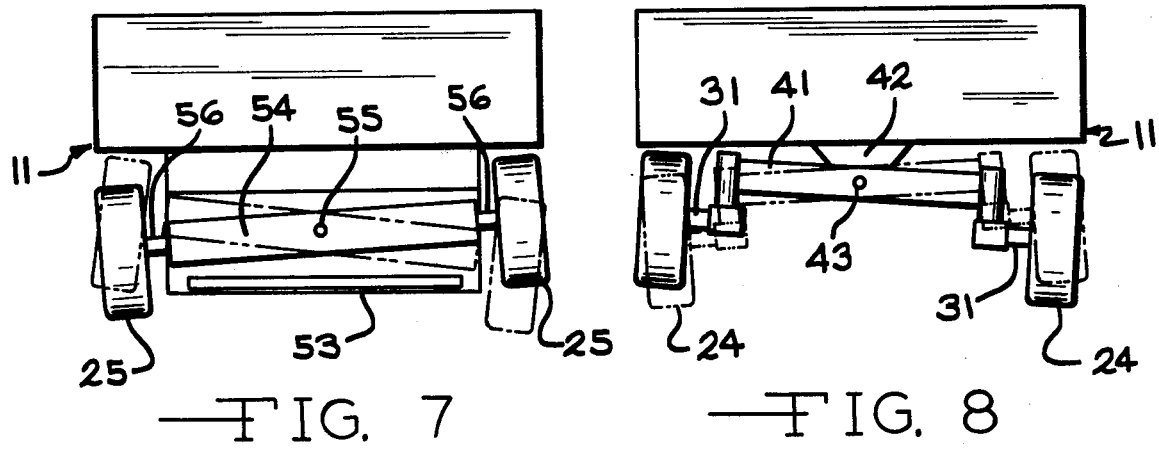
FIG. 7
FIG. 8

WEIGHT VEHICLE APPARATUS

The invention relates generally to a scale testing vehicle and more specifically to a self-powered cart adapted to transport calibrated weights; the total weight of the cart and weights being utilized to calibrate high capacity platform scales.

Platform scales are well known in the art and are utilized for many purposes. For example, platform scales are utilized by commercial enterprises which deal in large quantities of bulk materials, such as grain elevators. Similarly, governments utilize platform scales in their vehicle weight limit enforcement programs to determine whether semi-trailer and tractor units are complying with their highway load limits.

The scales may be either mechanical or electronic scales. In either event, the scales often have a plurality of individual scale platforms, for example, a series of three platforms. By mechanical linkage or by electronic load cells, as a vehicle rests on one or more of the platforms, the weight is indicated by the scales.

It is not unusual for platform scales to measure vehicles and their loads weighing typically twenty tons and in some cases as high as one hundred tons. Dirt and friction have a tendency to build up at critical points in mechanical scales and restrict the action of such mechanisms. When this occurs, the scales read a lower weight than the actual weight. Similarly, drift in the components of electronic scales affects their calibration. With such devices, the reading may be either above or below the proper weight. In either event, the consequences of inaccurate weight indication such as overpayment or underpayment for a load of bulk material or detention of a properly loaded vehicle are manifest.

Accordingly, the prior art has recognized for a long time that it is important to periodically calibrate platform scales. In the past, platform scales were tested by placing individual weight units, normally either five hundred pound units or one thousand pound uints, upon the individual platform sections of a platform scale. It was not unusual to have two men spend a considerable amount of time unloading the weights, testing the scales and reloading the weights onto a vehicle which carries them to and from the site of scales under test.

In addition to the recognized need for calibration, it is also known that the accuracy of scales will vary at different loadings. That is, scales may indicate the correct weight at one point in their range but exhibit a deviation from the correct indication at another point of their range. Therefore, calibration techniques required by state agencies commonly require platform scales to be calibrated at different loadings, the heaviest loading often being substantially above the scales' rated capacity.

Furthermore, it has been found that the particular placement of a vehicle on a scale platform also affects the indication of the scales. Approved calibration techniques therefore also require that the scales be calibrated with the weights positioned at various locations upon the scale platform. The constraint of time and the necessity of varying the amount and location of weight on a scale to ensure proper calibration suggest that a device which is easily transportable, which is capable of carrying a substantial quantity of calibration weights, which uniformly distributes the weight it is carrying and which is easily movable about a platform scale is desirable.

One prior art solution involves a vehicle capable of concentrating its entire calibrated load on one section of a multi-section scale. The vehicle further includes a hydraulic crane which loads and unloads the calibrated one thousand pound weights onto a section of the scale which requires individual testing or calibration at a lesser load. With this vehicle or prior art methods, the calibrated weights would have to be individually transported and positioned on the scale section under test which is laborious and time consuming.

The present invention relates to a scale testing cart. A cart according to the present invention includes a generally rectangular frame having a flat bed and peripheral rail which receives and retains a plurality of uniform weights. The peripheral rail is secured to the frame of the cart at a height above the flat bed approximately equal to the height of the weights. Thus, a second level of weights may be stacked upon the first level and be stabilized by the peripheral rail. The cart further includes a suspension system having various longitudinally and transversely pivoted members which support six wheels and a hydraulic system powered by a gasoline engine which provides steering and motive capabilities. A rear pair of wheels are steerably mounted upon an axle which is longitudinally, pivotally secured to the frame of the cart. A front pair of wheels are rotatably secured to a bogie-like subframe which is transversely, pivotally secured to the frame of the weight cart. Positioned between the front and rear pairs of wheels is a third axle having wheels rotatably secured to its termini and which is longitudinally, pivotally secured to the transversely, pivotally secured bogie-like subframe.

The rear pair of wheels are rotatably mounted upon stub shafts which are pivotally secured to the termini of the rear axle. The wheels and stub shafts are pivoted about vertical axes by a hydraulic cylinder, thus steering the weight cart. The front pair of wheels are independently linked to fail-safe, that is, normally engaged brakes and to hydraulic gear motors. The simultaneous application of pressurized hydraulic fluid to the brakes and gear motors releases the brakes and causes the cart to move. Two hydraulic pumps powered by a gasoline engine provide energy to the hydraulic steering and motive system of the weight cart.

Thus, it is the object of this invention to provide a means for the calibration of platform scales having at least one section.

It is another object of this invention to provide for the transportation of the calibration weights from one section of the platform scales to another section.

It is a further object of this invention to provide for the transportation of the calibration weights from one area of a scale platform to another.

It is still further object of this invention to provide a weight cart having a suspension system which distributes the weight contained therein in a highly uniform manner among the cart wheels.

It is still further object of this invention to provide for the rapid, safe and convenient calibration of platform scales.

FIG. 4 is an end elevational view of a scale testing cart according to the present invention, showing the location of the hydraulic gear drive motors;

FIG. 5 is a diagrammatic side elevational view similar to FIG. 3, illustrating various positions of the pivoted axle;

FIG. 6 is a diagrammatic sectional view of a scale testing cart according to the present invention taken along line 6—6 of FIG. 5;

FIG. 7 is a diagrammatic sectional view of a scale testing cart according to the present invention taken along line 7—7 of FIG. 5;

FIG. 8 is a diagrammatic sectional view of a scale testing cart according to the present invention taken along line 8—8 of FIG. 5.

Figure 1:
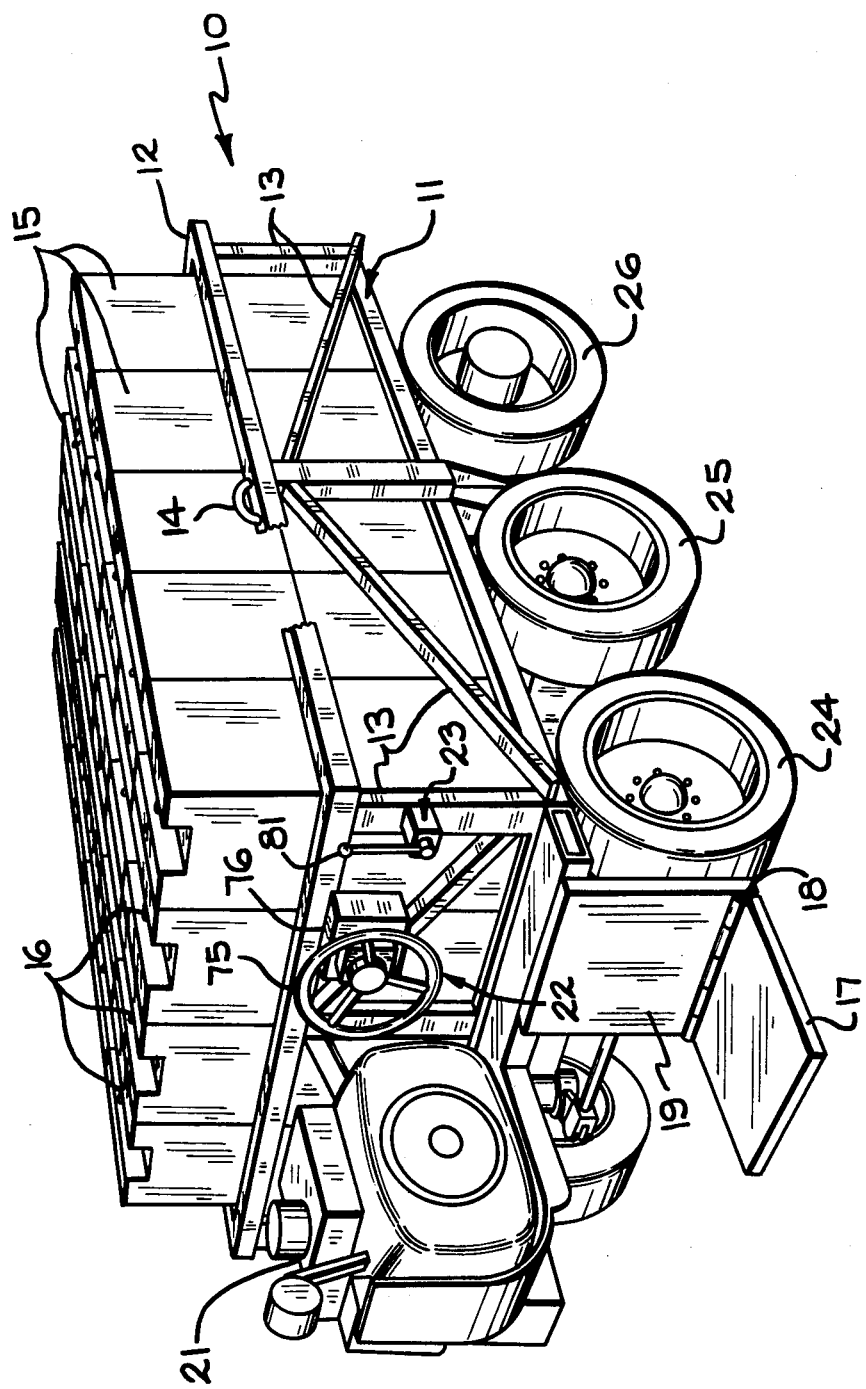
FIG. 1 is a perspective view of a scale testing cart according to the present invention showing two levels of weights in place in the cart.

Referring now to FIG. 1, a weight cart according to the present invention is shown and is generally designated by the reference numeral 10. The weight cart 10 includes a generally rectangular frame 11 having a flat horizontal bed (not shown) and an upper peripheral rail 12 spaced apart from and braced to the frame 11 by a plurality of vertical and diagonal supports 13. On the upper surface of the peripheral rail 12 are secured two lifting eyelets 14 by which the cart 10 may expeditiously be lifted by a crane or hoist. The inside horizontal dimensions of the frame 11 and rail 12 are such as to snugly contain a plurality of uniform, calibrated weights 15. The calibrated weights 15 each include a horizontal handle 16 which facilitates the lifting and transporting of the individual weights 15 with a loading device. The weights 15 are arranged in adjacent parallel rows. The preferred embodiment of the weight cart 10 envisions the use of forty, one thousand pound weights arranged in two levels of twenty weights each, as is illustrated in FIG. 1. The handles 16 of the weights 15 are uniformly aligned, as illustrated, which facilitates their rapid loading and unloading from the cart 10.

The cart 10 further includes an operator platform 17 which is connected by a hinge 18 to a vertical support member 19 depending from the frame 11. The operator platform 17 is movable between the horizontal position illustrated in FIG. 1 and a vertical position adjacent the vertical support member 19. The operator platform 17 may thus be positioned horizontally to permit an operator to ride upon the weight cart 10 as it is being moved or may be stowed in its vertical position when it is not in use. The various structural members of the weight cart 10 may be cold rolled steel or other suitable material and the members may be assembled by permanent means such as welding or semi-permanent means such as threaded fasteners.

Figure 9:
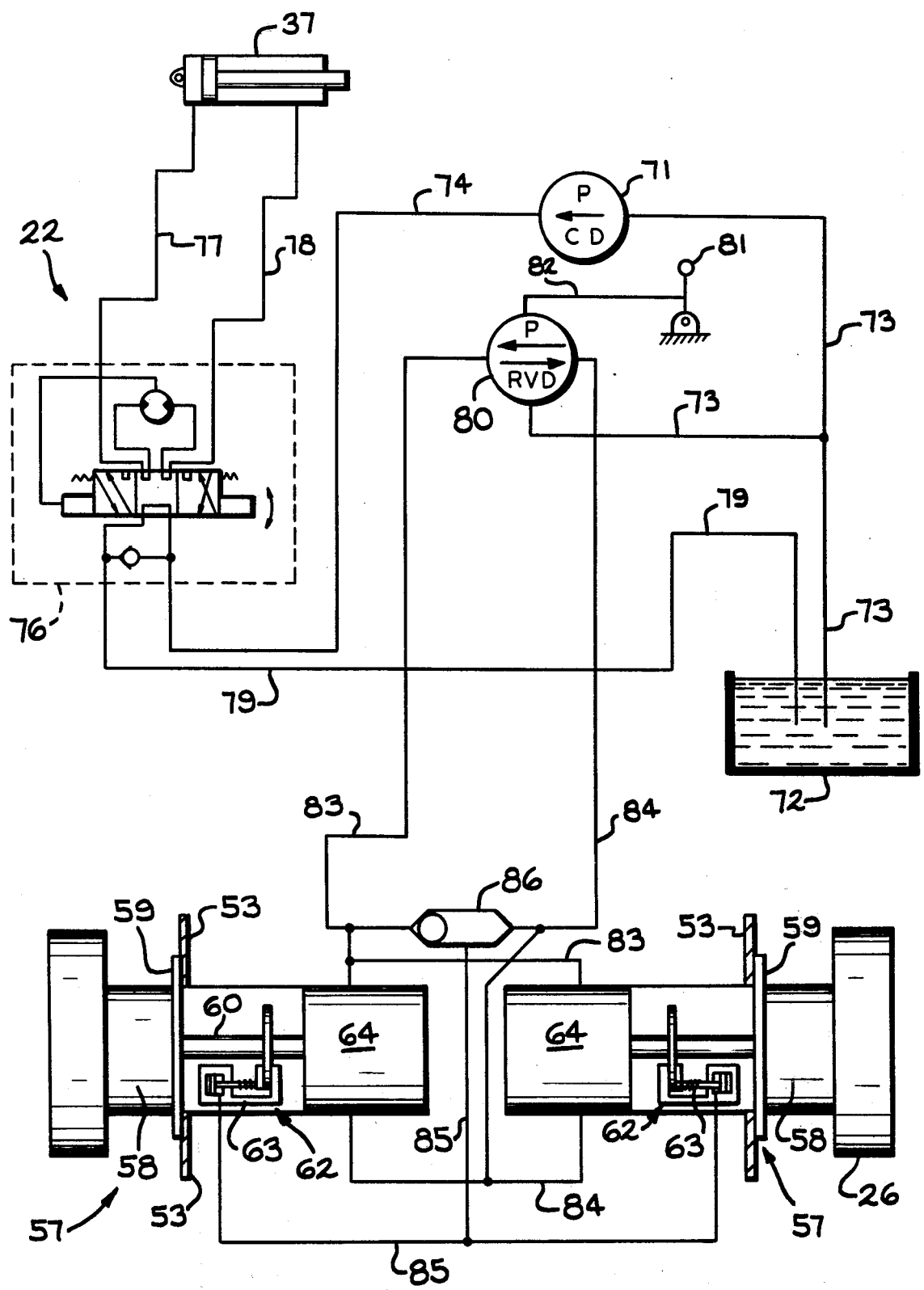
FIG. 9 is a schematic diagram of the hydraulic control system of a scale testing cart according to the present invention.

The weight cart 10 further includes a gasoline engine 21 of conventional design secured to the frame 11 which powers a conventional hydraulic pump (see FIG. 9). The gasoline engine 21, for example, may be like the series K301 manufactured by the Kohler Company. A hydraulic steering assembly 22 and a directional control assembly 23 control the steering and forward and reverse motion of the weight cart 10, respectively. The weight cart 10 is also seen to include a first, a second and a third pair of wheels denominated 24, 25 and 26, respectively. The wheels 24, 25 and 26 are preferably of solid rubber or similar material designed to withstand the per wheel loading of this service which will typically exceed 6,000 pounds per wheel.

Figure 2:
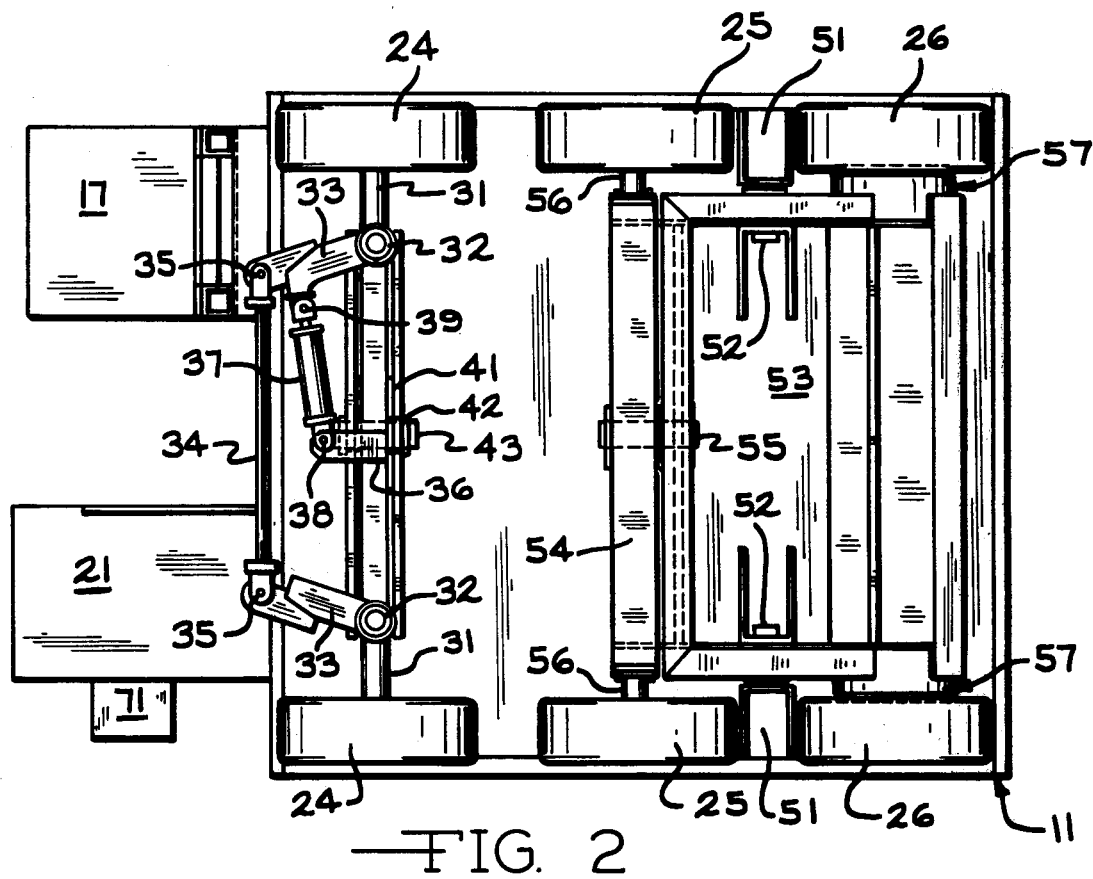
FIG. 2 is a bottom plan view of a scale testing cart according to the present invention.
Figure 3:
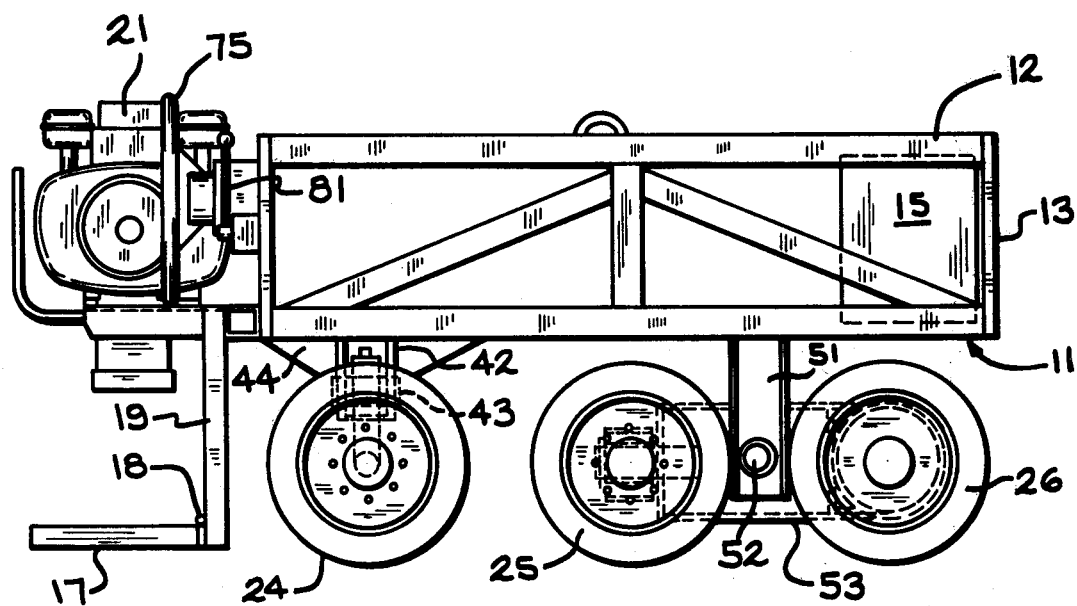
FIG. 3 is a side elevational view of a scale testing cart according to the present invention.

Referring now to FIGS. 2 and 3, the wheels 24 rotate freely upon the termini of two stub axles 31. The stub axles 31 are pivoted at their opposite ends on two vertically disposed kingpins 32. Attached to each stub axle 31 and disposed at approximately right angles thereto is a steering arm 33. Linking the two steering arms 33 is a tie rod 34 which is pivotally connected to the steering arms 33 by two vertically disposed pivot pins 35. Pivotally disposed intermediate one of the steering arms 33 and a central support 36 is a conventional double-acting hydraulic cylinder 37. The hydraulic cylinder 37 is pivotally connected to the support 36 by means of a pivot pin 38 and the piston end of the hydraulic cylinder 37 is pivotally connected to the steering arm 33 by means of a pivot pin 39. The application of pressurized hydraulic fluid to the double-acting hydraulic cylinder 37 is thus capable of pivoting the steering arms 33, stub axles 31 and wheels 24 about the kingpins 32 in a conventional manner to effect steering of the weight cart 10.

The kingpins 32 are affixed to a horizontally disposed axle member 41 pivoted about a longitudinal axis of the weight cart 10. The axle member 41 is retained in a yoke 42 depending from the weight cart frame 11 by a pivot pin 43. The yoke 42 may be braced to the weight cart frame 11 by suitable triangular braces 44 or similar means. The pivot pin 43 is of conventional design having a head at one end and a smaller diameter body which may be passed through openings within the yoke 42 and axle member 41 and retained therein by means of a retaining ring (not shown) or other means known in the art. Reference to FIGS. 5 and 8 illustrates the freedom of the axle member 41 and structures connected thereto about the longitudinal axis defined by the pivot pin 43.

Referring again to FIGS. 2 and 3, a pair of vertical support member 51 can be seen to depend from the frame 11 of the weight cart 10. Near the lower portion of the vertical support members 51 are openings through which pivot pins 52 pass. The pivot pins 52 are disposed along a horizontal axis transverse to the frame 11 of the weight cart 10. The pivot pins 52 pass through openings in a bogie-like subframe assembly 53 and are retained therein by a retaining ring (not shown) or other means known in the art. The bogie-like subframe assembly 53 is thus free to move about the axis defined by the pair of pivot pins 52 in a fashion illustrated in FIGS. 5 and 6. The subframe assembly 53 is of generally rectangular box-like construction of sufficient strength to withstand the substantial torsional and static forces to which it will be subjected in the course of its use. On the vertical surface of the subframe assembly 53 which is approximately midway between the pairs of wheels 24 and 26 is a third axle assembly 54 which is pivoted about a longitudinal axis of the weight cart 10. The axle assembly is pivoted about its midpoint on a generally horizontal, longitudinally disposed pivot pin 55. The pivot pin 55 is like those previously described and includes an enlarged head portion and retaining means which retain it within openings in the subframe assembly 53 and axle assembly 54, thereby maintaining these assemblies in proper pivotal relationship. At each termini of the axle support assembly 54 are stub axles 56 which support the second pair of wheels 25 in freely rotatable fashion. FIGS. 5 and 7 illustrate the motion freedom of the longitudinally and transversely pivoted axle assembly 54.

Referring now to FIGS. 2, 4 and 9, the bogie-like subframe assembly 53 is seen to include a pair of transversely mounted hydraulic gear motor and brake assemblies 57 which are operably connected to the third pair of wheels 26. The wheels 26 are each mounted upon a torque hub 58 which has an outer stationary flange 59 attached directly to the subframe assembly 53. Each torque hub 58 functions as a bearing through which a shaft 60 passes. Each torque hub 58 also includes a gear-type speed reducer having a reduction ratio of approximately thirty-five to one. Such torque hubs are well known in the art and may be like or similar to the Model W1B manufactured by Fairfield Manufacturing Company.

The shafts 60 each extend inwardly from the torque hubs 58 to separate fail-safe brakes 62. The brakes 62 are normally engaged, that is, they are normally on and the application of pressurized hydraulic fluid against a spring-biased piston 63 in each brake 62 is necessary to release them. Such braking devices are well known in the art and a unit such as the Ausco Model 27798 or similar unit may be employed to accomplish this braking function.

The inward termini of shafts 60 are connected to independent hydraulic gear motors 64. The shafts 60 rotate clockwise or counterclockwise in response to the direction of flow of hydraulic fluid through the gear motors 64. By selecting the direction of fluid flow, forward or reverse travel of the cart 10 is effected. The hydraulic gear motors 64 are well known in the art and units like or similar to the Series M-3 manufactured by Borg-Warner may be utilized.

Referring now to FIGS. 1 and 2 and especially to FIG. 9, the complete hydraulic power and control system is illustrated. The gasoline engine 21 drives two hydraulic pumps which independently power the steering and motive systems of the weight cart 10. A conventional constant delivery (i.e., fixed displacement) hydraulic pump 71, such as an S15-S6AHIIL hydraulic pump manufactured by Sunstrand, powers the hydraulic steering system. The hydraulic pump 71 draws hydraulic fluid from a sump 72 along a supply line 73 and discharges it under pressure into a pressurized line 74. The line 74 supplies pressurized fluid to the hydraulic steering assembly 22. The steering assembly 22 includes a steering wheel 75 which is operably connected to a steering control mechanism 76. The steering control mechanism 76 controls the supply and release of hydraulic fluid through two hydraulic line 77 and 78 to the double-acting hydraulic cylinder 37 in response to the rotation of the steering wheel 75. Such a steering control mechanism 76 is well known in the art and the Model UK312 manufactured by Char-Lynn or a similar unit may be employed to accomplish steering control of the weight cart 10. Hydraulic fluid returning from the steering control assembly 22 flows through a return line 79 to the sump 72.

The second pump driven by the gasoline engine 22 is a reversible flow, variable displacement pump 80. The pump 80 draws hydraulic fluid from the sump 72 through the supply line 73. The pump 80 is preferably an axial piston, variable inclination swash plate type pump, having a servo-control system which adjusts the swash plate angle, such as the Sundstrand 18-2023. The directional control assembly 23 comprises a pivoted lever 81 and a mechanical linkage 82 connecting the lever 81 with the servo-control adjustment on the pump 80. Movement of the lever 81 to the left or right from the neutral position in which it is illustrated moves the linkage 82 and the swash plate of the pump 80 from a neutral position to an inclination causing pressurized hydraulic fluid to be pumped into one of the two hydraulic supply lines 83 and 84 and returned in the other. The hydraulic lines 83 and 84 carry pressurized hydraulic fluid to and from the hydraulic gear motors 64. The direction of flow of pressurized and return hydraulic fluid in the hydraulic lines 83 and 84 determines the direction of rotation of the hydraulic gear motors 64 and thus the direction of travel of the weight cart 10. The pump 80, the hydraulic lines 83 and 84 and the gear motors 64 operate as a closed hydraulic circuit. Thus, once the circuit has been charged through the supply line 73, additional hydraulic fluid and a return flow path to the sump 72 are generally unnecessary.

Pressurized fluid is also supplied to the fail-safe brakes 62 through a hydraulic line 85. Interposed between the two hydraulic supply lines 83 and 84 is a two-way check or shuttle valve 86. The shuttle valve 86 senses the pressure in the two hydraulic lines 83 and 84, closes off that line having the lower pressure, and connects that line having the higher pressure to the line 85 and the brakes 62, thereby permitting the buildup of pressure behind the spring-biased pistons 63 and the release of the brakes 62. The shuttle valve 86 is well-known in the hydraulic control art and the Racine Hydraulics Model MHO4T or similar unit may be utilized. Selective application of pressurized hydraulic fluid to the gear motors 64 through the hydraulic lines 83 and 84 and through the shuttle valve 86 to the brakes 62, releases the brakes 62 and accomplishes forward or rearward motion of the cart 10.

The steering and motive hydraulic circuits preferably also include such conventional components as filters and pressure reliefs. Inasmuch as their application is deemed to be well known in the art, these components will not be described in further detail.

The operation and use of the weight cart 10 is straightforward. Preferably, the weight cart 10 would be moved to the site of the platform scales to be calibrated in a truck suitable for highway travel. The weight cart 10 could be lifted and removed from the trailer by utilizing the lifting eyelets 14 or starting the gas engine 21 and driving the cart 10 down a ramped surface and off the trailer. The weight cart 10 is then loaded with the appropriate number of one thousand pound weights 15 up to a maximum of forty weights or forty thousand pounds. It is envisioned that the weight cart 10, exclusive of the weights 15, would weight a carefully calibrated amount, such as four thousand pounds. Such a calibrated weight cart 10 would facilitate the calibration of platform scales and militate against arithmetic errors in the calculation and correction of platform scales indications. With the gas engine 21 operating, the weight cart 10 may be moved forward and rearward by the use of the hydraulic control assembly 23 and steered in the desired direction by the use of the steering assembly 22. Thus, it is clear that the weight cart 10 may be conveniently and rapidly moved between the sections of a platform scale and furthermore positioned at will upon a certain point of an individual platform scale section. The transversely and longitudinally pivoted axles and rubber wheels assure the even distribution of the weight contained in the weight cart 10.

It will be apparent to those skilled in the art that various modifications may be made to the preferred embodiment described above without departing from the spirit and scope of the following claims.

I claim:

1. A scale testing vehicle for selectively positioning scale calibration weights on platform scales, comprising, in combination, a frame forming a weight bed, said frame having a longitudinal axis, at least one weight positioned on said bed, and a suspension system having a first axle pivotally secured to said frame for movement about such longitudinal axis of said frame, said first axle having two ends, a first pair of rotatable wheels, means attaching said first wheels to said ends of said first axle, a subframe having a longitudinal axis, means pivotally securing said subframe to said frame for movement about a transverse axis of such vehicle, a second pair of rotatable wheels, means securing said second pair of wheels to said subframe on a transverse axis of such vehicle, a second axle having two ends, means pivotally attaching said second axle to said subframe for movement about the longitudinal axis of said subframe, a third pair of rotatable wheels attached to said ends of said second axle, and wherein said first, second and third wheels are located to uniformly distribute on a platform scale the load of the scale testing vehicle.

2. The scale testing vehicle of claim 1, wherein said means attaching said first wheels to said first axle ends includes means for steering such vehicle, and further including means associated with at least one wheel of at least one of said second and third pairs of wheels for propelling and braking such vehicle.

3. A scale testing vehicle for selectively positioning scale calibration weights on platform scales, comprising, in combination, a generally horizontal frame forming a weight bed, a plurality of weights positioned on said bed, and a suspension system including a first axle pivotally attached to said frame for movement about a longitudinal axis of such vehicle and having a pair of steerable, freely rotatable wheels attached to the termini of said axle, a bogie-like subframe pivoted about a transverse axis of said vehicle, a pair of drive wheels mounted for rotation on said subframe and operably connected to means for propelling and braking such vehicle, a second axle pivotally attached to said subframe for movement about a longitudinal axis of said subframe, a second pair of freely rotatable wheels attached to the termini of said second axle, said means for propelling and braking such vehicle comprising at least one hydraulic fluid motor and and at least one hydraulically released, normally engaged brake operably connected to said pair of drive wheels, and means for simultaneously supplying pressurized hydraulic fluid to said means for propelling and braking such vehicle.

4. The scale testing vehicle of claim 3 wherein said first axle includes means for steeringly positioning said pair of wheels attached to the termini of said first axle.

5. The scale testing vehicle of claim 4 wherein said means for steeringly positioning said pair of wheels attached to the termini of said first axle comprises at least one hydraulic cylinder.

6. The scale testing vehicle of claim 3 further including a peripheral rail secured to and vertically spaced from said frame.

7. The scale testing vehicle of claim 6 wherein said peripheral rail further includes means engageable by lifting devices for lifting and moving such vehicle.

* * * * *